(12) United States Patent
Liu et al.

(10) Patent No.: US 7,781,998 B2
(45) Date of Patent: Aug. 24, 2010

(54) FAN SYSTEMS

(75) Inventors: Ming-Lung Liu, Taoyuan Hsien (TW);
Yi-Chieh Cho, Taoyuan Hsien (TW);
Chia-Feng Wu, Taoyuan Hsien (TW);
Yueh-Lung Huang, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 516 days.

(21) Appl. No.: 11/790,851

(22) Filed: Apr. 27, 2007

(65) Prior Publication Data
US 2007/0258805 A1   Nov. 8, 2007

(30) Foreign Application Priority Data
May 2, 2006   (TW) ............................... 95115553 A

(51) Int. Cl.
*H02P 6/14* (2006.01)
(52) U.S. Cl. ............................ 318/400.26; 318/400.21; 318/400.29; 318/293
(58) Field of Classification Search ................ 318/286, 318/293, 400.21, 400.22, 400.26, 400.29, 318/400.38, 430, 431, 434
See application file for complete search history.

(56) References Cited

U.S. PATENT DOCUMENTS

| 3,582,744 | A | * | 6/1971 | Coffey et al. | 388/833 |
| 4,361,793 | A | * | 11/1982 | Nordell | 318/729 |
| 4,847,541 | A | * | 7/1989 | Krieger | 318/468 |
| 5,117,170 | A | * | 5/1992 | Keane et al. | 318/646 |
| 5,349,275 | A | * | 9/1994 | Muller | 318/400.29 |
| 5,449,988 | A | * | 9/1995 | Gurstein et al. | 318/430 |
| 6,023,139 | A | * | 2/2000 | Chin | 318/434 |
| 6,087,800 | A | * | 7/2000 | Becker et al. | 318/778 |
| 6,147,465 | A | * | 11/2000 | Hollenbeck | 318/400.26 |
| 6,313,597 | B1 | * | 11/2001 | Elliott et al. | 318/701 |
| 6,995,531 | B2 | * | 2/2006 | Ichimaru et al. | 318/400.29 |
| 2004/0075407 | A1 | * | 4/2004 | Ohiwa et al. | 318/254 |

* cited by examiner

*Primary Examiner*—Bentsu Ro
*Assistant Examiner*—Thai Dinh
(74) *Attorney, Agent, or Firm*—Birch, Stewart, Kolasch & Birch, LLP

(57) ABSTRACT

A fan system comprising a first switch, a second switch, a coil, and a drive device. The drive device comprises a third switch and a fourth switch. The third switch, the fourth switch, the first switch, the second switch and the coil form a bridge connection.

4 Claims, 5 Drawing Sheets

FAN SYSTEMS

BACKGROUND OF THE INVENTION

1. Field of the Invention

The invention relates to a fan system, and in particular to a fan system capable of enhancing the output power and reducing the cost.

2. Description of the Related Art

Electronic systems generate heat based on the amount of data they process. Because some electronic systems provide fast and continuous operations, heat dissipation devices for these electronic systems are more important. Various heat dissipation products are provided, and fan systems are currently among the popular.

FIG. 1 depicts a conventional fan system. A fan system 1 is electrically connected to a power supply 2 to receive the power. The fan system 1 comprises a drive device 10, a sensor 20, a first switch S1, a second switch S2, a third switch S3, a fourth switch S4, and a coil L. The drive device 10 is electrically connected to the power supply 2. The sensor 20 can be a Hall sensor and is electrically connected to the drive device 10. The first switch S1, the second switch S2, the third switch S3, the fourth switch S4, and the coil L that constitute a bridge connection. The first switch S1 and the second switch S2 is electrically connected to the power supply 2 and the drive device 10, respectively. The third switch S3 and the fourth switch S4 are electrically connected to the drive device 10, respectively.

The drive device 10 controls the switches S1 to S4 to turn on or off so that current flowing through the coil L is changed, and thus a motor (not shown in FIG. 1) disposed in the fan system 1 and having the coil L is driven. The sensor 20 is used to detect the rotation rate of the motor and generate a signal to the drive device 10. Therefore, the drive device 10 adjusts the rotation rate of the motor according to the signal.

FIG. 2 depicts another conventional fan system. A fan system 3 is electrically connected to a power supply 2 to receive the power. The fan system 3 comprises a drive device 30, a sensor 20, and a coil L. The drive device 30 is electrically connected to the power supply 2. The sensor 20 can be a Hall sensor electrically connected to the drive device 30. The coil L is electrically connected to the drive device 30. The difference between the fan systems 1 and 3 is that the drive device 30 is implemented by an integrated circuit (IC) to dispose the first to fourth switches S1 to S4 in the drive device 30. The first to fourth switches S1 to S4 and the coil L form a bridge connection.

Most elements of the fan system 3 are the same as those of the fan system, and description of the fan operation is omitted.

In FIG. 1, the fan system 1 disposes the switches S1 to S4 outside of the drive device 10. Thus, the circuit of the fan system 2 is complicated that has a large number of elements. Thus, it requires more working time, manpower, and cost in test or production process. Therefore, the fan system 3 is developed to replace the fan system 2. In the fan system, the switches disposed in the drive device 30 so that generates heat easily. The drive device 30 thus operates at a high temperature and easy to damage. Moreover, the configuration of the fan system 3 causes low output power, and the suitability and economic benefits of the fan system 3 is less than the fan system 1.

The two described fan systems both have some drawbacks. Thus, an improved fan system is desired to provide.

BRIEF SUMMARY OF THE INVENTION

In view of the foregoing, the invention is to provide a fan system that can improve the drawbacks of complicated circuit, heat produced easily, high manufacturing cost and low output power.

According to the foregoing objects and others, the present invention provides a fan system includes a first switch, a second switch, a coil, and a drive device. The drive device comprises a third switch and a fourth switch. The third and fourth switches form a bridge connection with the first and second switches.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
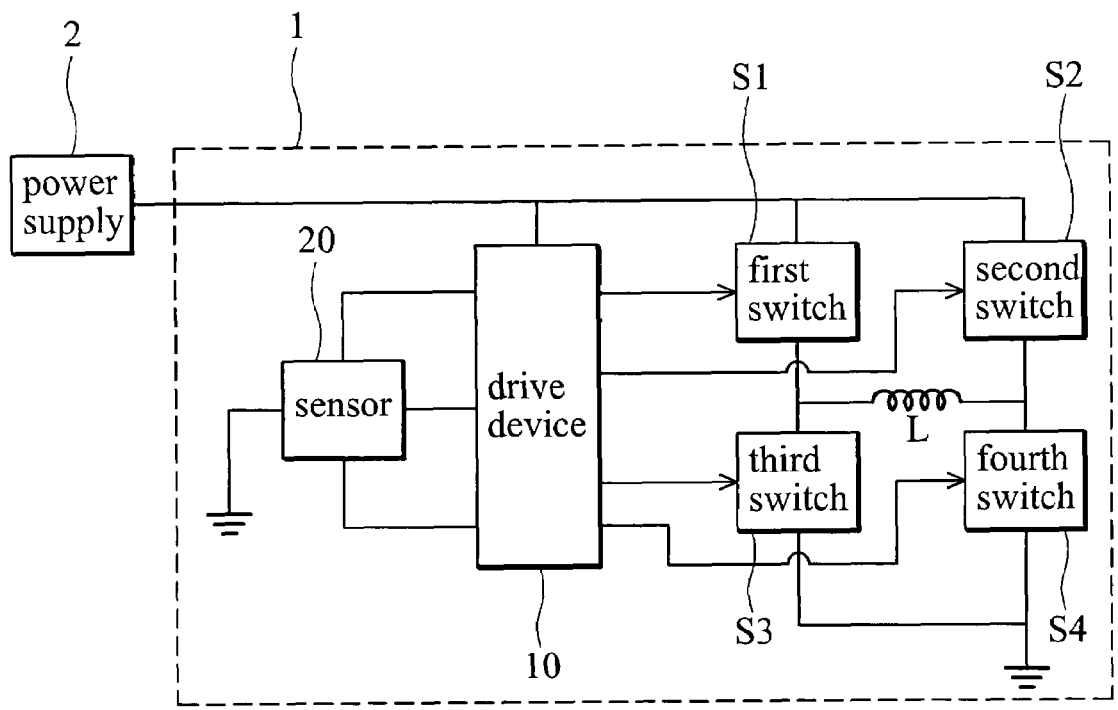
FIG. 1 depicts a conventional fan system.
Figure 2:
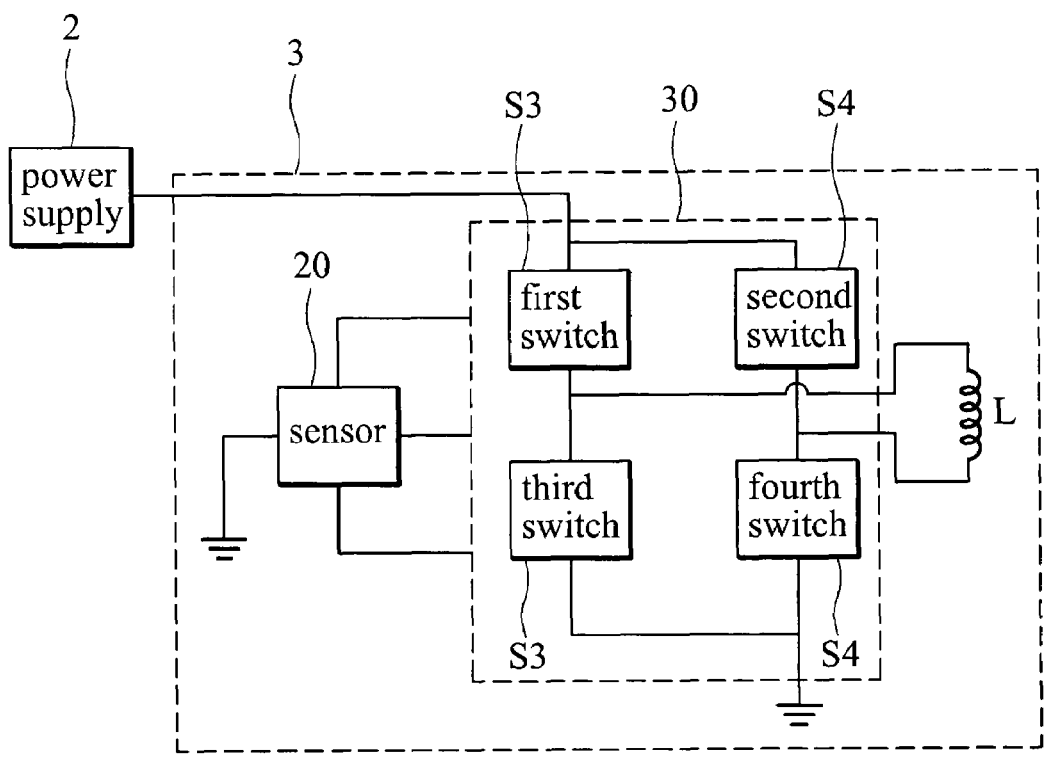
FIG. 2 depicts another conventional fan system.
Figure 3:
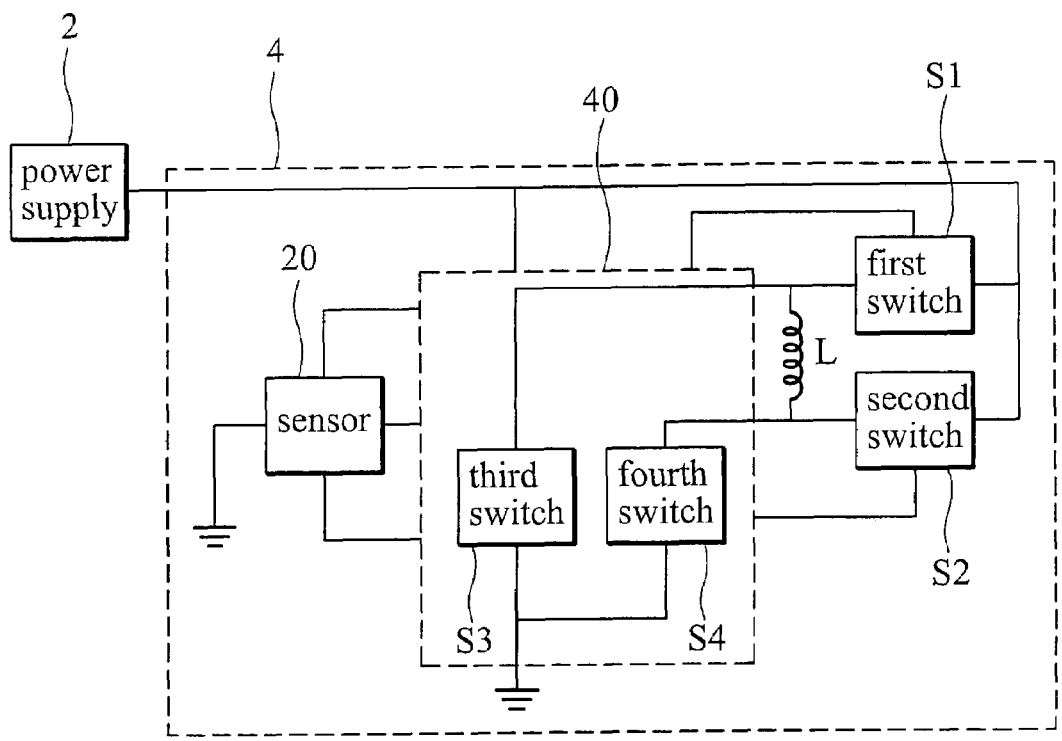
FIG. 3 depicts an exemplary embodiment of a fan system.

As shown in the FIG. 3, a fan system 4 according to a preferred embodiment of the invention is provided. The fan system 4 is electrically connected to a power supply 2 and comprises a drive device 40, a sensor 20, a first switch S1, a second switch S2, and a coil L. The drive device 40 is electrically connected to the power supply 2. The sensor 20 is electrically connected to the drive device 40. The first switch S1 and the second switch S2 are electrically connected to the power supply 2 and the drive device 40. The coil L is electrically connected to the first switch S1 and the second switch S2.

The drive device 40 further comprises a third switch S3 and a fourth switch S4. The third switch S3 and the fourth switch S4 form a bridge connection with the first switch S1 and the second switch S2. The drive device 40 controls the switches S1 to S4 to turn on or off so that current flowing through the coil L is varied. Therefore, a motor (not shown in FIG. 3) disposed in the fan system 1 and comprising the coil L is driven. The sensor 20 can be a Hall sensor and detects the rotation rate of the motor, so as to generate a signal to the drive device 40. The drive device 10 thus adjusts the rotation rate of the motor according to the signal.

The drive device 40 can be implemented by an integrated circuit (IC). The third switch S3 and the fourth switch S4 are directly disposed on the inside of the IC by the IC fabrication process.

It notes that the first switch S1 and the second switch S2 can be P-type transistors, and the third switch S3 and the fourth switch S4 can be N-type transistors. The N-type transistors are easy to manufacture on the inside of the drive device 40 so that the drive device 40 has a desirable probability to be successful during the produced process. Due to the characteristics of the N-type transistors, the drive device 40 has a higher output power, thus enhancing the suitability and reducing the cost. Moreover, the first switch S1 and the second switch S2 (P-type transistors) are disposed outside of the drive device 40. Consequently, the heat generated on the inside of the IC is reduced and the probability of damaging the drive device 40 is also reduced.

Figure 4:
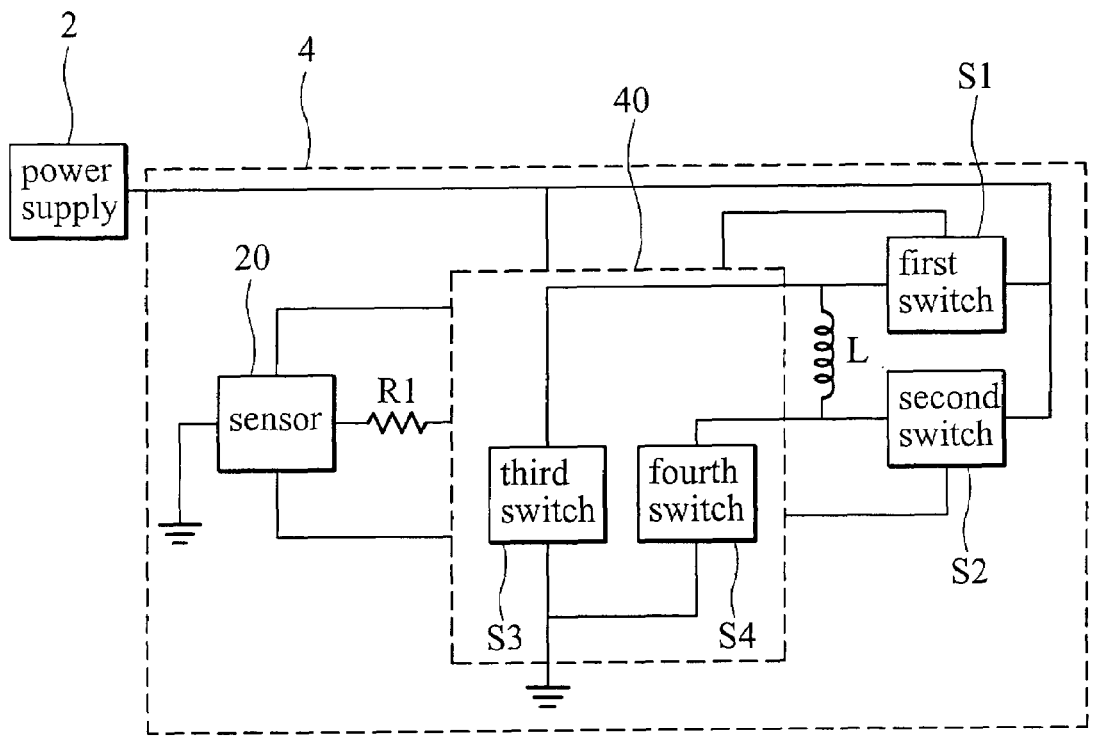
FIG. 4 depicts an exemplary embodiment of a fan system.
Figure 5A:
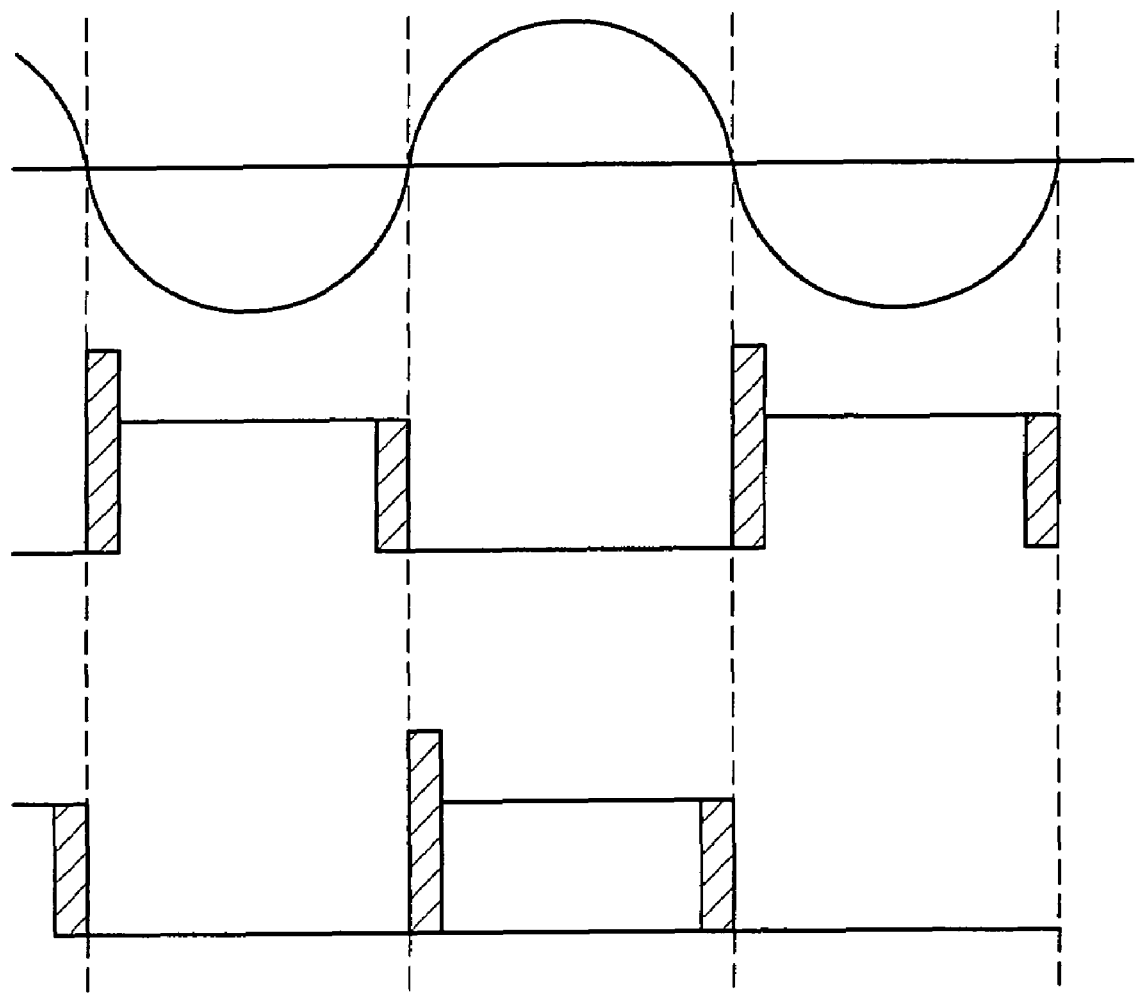
FIG. 5A shows waveforms of voltage and current of the fan system in FIG. 3.
Figure 5B:
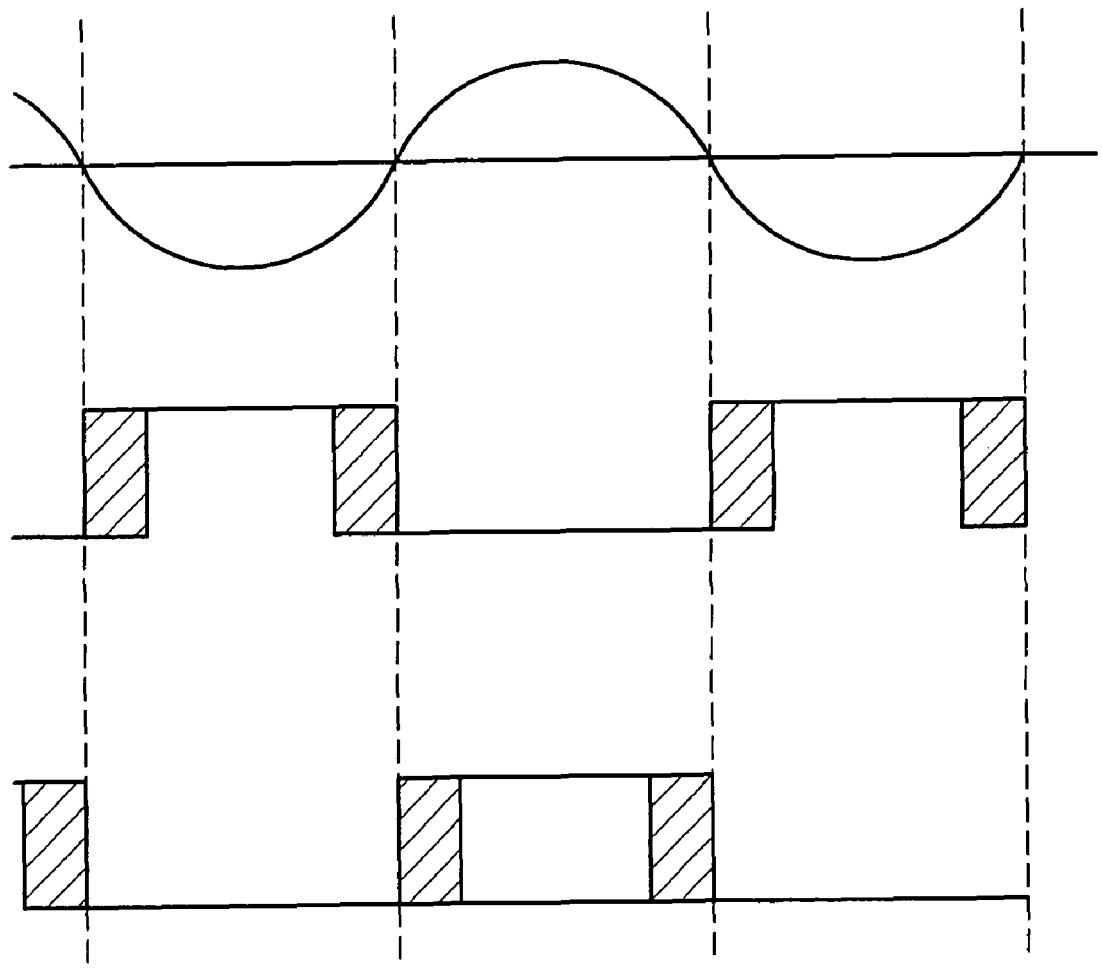
FIG. 5B shows waveforms of voltage and current of the fan system in FIG. 4.

Referring to FIG. 4, the fan system 4 further comprises a first resistor R1 electrically connected to the sensor 20 and the drive device 40. The first resistor R1 is used to limit the current. A Current output from the drive device 40 and input to the sensor 20 that is increased by the first resistor R1. Hence, a waveform of voltage, which is feed back to the drive device 40 from the sensor, is changed. Please refer to the FIGS. 5A and 5B, FIG. 5A shows a waveform of voltage (sine wave) fed back to the drive device 40 from the sensor 20, and a waveform of current (two-square wave) output to the switches from the drive device 40 if the first resistor is not disposed in the fan system 4 (as shown in FIG. 3). As mention above, the waveform of the current has surge waves during the inversion. That is because high frequency oscillation is generated on inside of the drive device 40, so that changes are promptly during the inversion (the slope of the waveform of the voltage is large at the inversion). The noise is thus generated when the motor is driven. Referring to FIG. 5B, the amplitude of the waveform of the voltage is reduced because of the first resistor R1, so that the slope of the waveform of the voltage become smaller during the inversion. Moreover, the waveform of the voltage changed slowly. Also, the influence to the waveform of the current because of high frequency oscillation is reduced, and the noise generated is effectively controlled if the motor is inverting.

Figure 6:
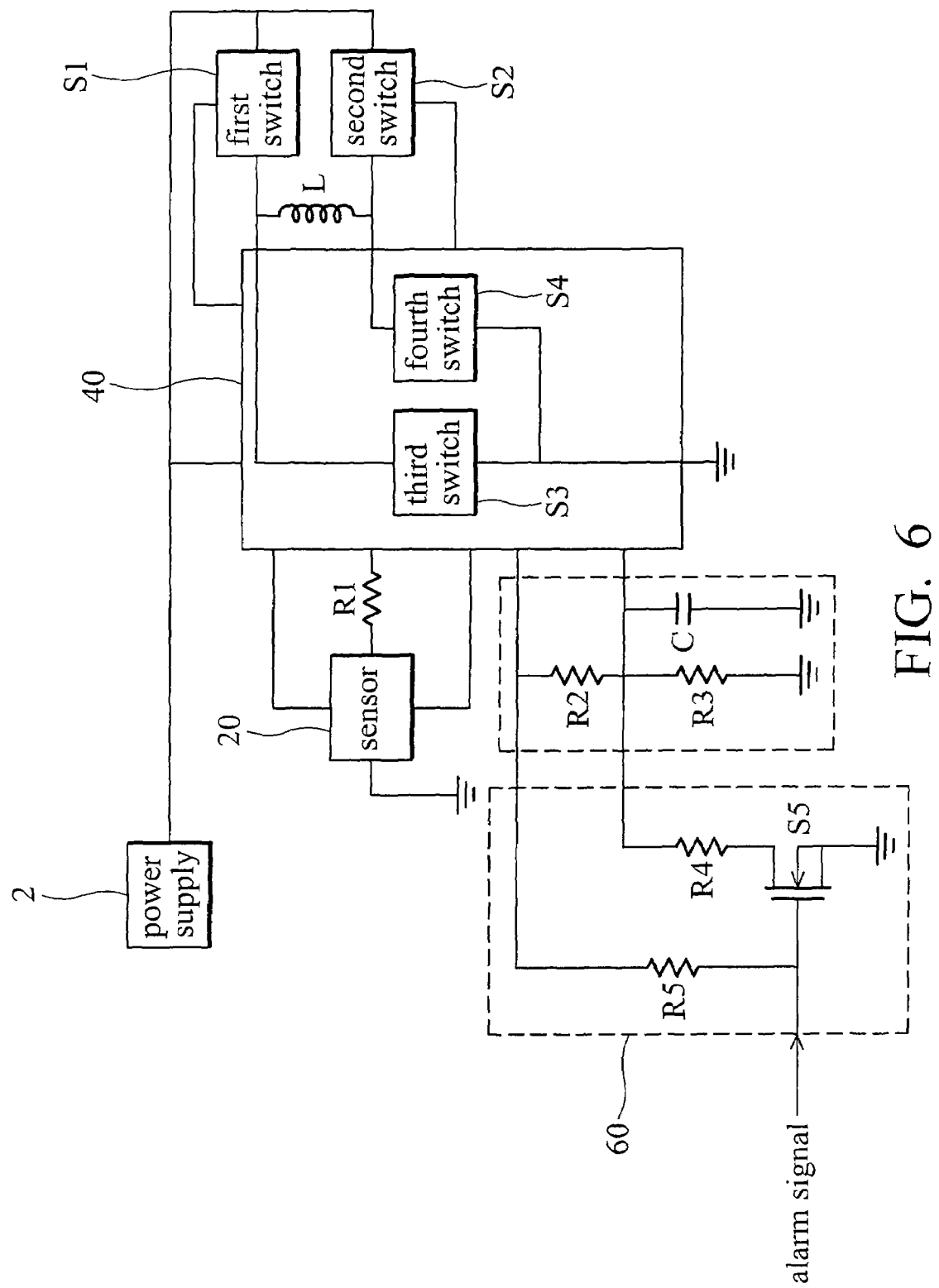
FIG. 6 depicts an exemplary embodiment of a fan system.

Referring to FIG. 6, the fan system 4 further comprises a soft-start unit 50 and a protection unit 60. The soft-start unit 50 is electrically connected to the drive device 40. The protection unit 60 is both electrically connected to the drive device 40 and the soft-start unit 50.

The soft-start unit 50 comprises a second resistor R2, a third resistor R3, and a capacitor C. One terminal of the second resistor R2 is electrically connected to the drive device 40, and the other terminal thereof is electrically connected to the drive device 40. One terminal of the third resistor R3 is electrically connected to the other terminal of the second resistor R2, and the other terminal of the third resistor R3 is electrically connected to ground. One terminal of the capacitor C is electrically connected to one terminal of the third resistor R3, and the other terminal thereof is electrically connected to ground. The second resistor R2 and the third resistor R3 form a voltage divider, which is electrically to the drive device 40 and ground. The voltage divider receives a voltage from the drive device 40 and divides the voltage. The voltage divider outputs divided voltage to charge the capacitor C. If the capacitor C is charged to a reference value, the drive device 40 starts to output the largest current to the switches for driving the motor to operate at full speed. The charge time is the soft-start time.

The protection unit 60 comprises a fourth resistor R4, a fifth resistor R5, and a fifth switch S5. One terminal of the fourth resistor R4 is electrically connected to the soft- start unit 50, and the other terminal thereof is electrically connected to a first terminal of the fifth switch S5. One terminal of the fifth resistor R5 is electrically connected to the soft-start unit 50, and the other terminal of the fifth resistor R5 is electrically connected to a second terminal of the fifth switch S5. A third terminal of the fifth switch S5 is electrically connected to the ground. If the fan system 4 is under a blocked state (such as the fan is blocked by an object), the second terminal of the fifth switch S5 receives an alarm signal V, and the fifth switch S5 is thus turned on. The capacitor C is rapidly discharged through the fifth switch S5 to the ground. Thus, it has no voltage remains in the capacitor C if the fan system 4 recovers from the blocked state, so that the soft-start function cannot be failed if the drive device 40 is restarted According to a fan system of the invention, two switches are disposed outside a drive device, and the other two switches are disposed on the inside of the drive device. The fan system has a simple circuit, low drive device operating temperature, low cost, and high output power.

Moreover, in a fan system of the invention, a current-limited resistor is electrically connected to a drive device and a sensor of the fan system, effectively lowering noise of the fan system.

In a fan system of the invention, a soft-start unit is electrically connected to a drive device of a fan system. A protection unit is disposed in the fan system to ensure that the soft-start unit operates accurately, thus errors of the soft-start unit are decreased, and the work efficiency of the fan system is enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fan system comprising:
   a first switch;
   a second switch;
   a coil;
   a drive device comprising a third switch and a fourth switch, and controlling the first, second, third, and fourth switches to turn on or off so that current flowing through the coil is varied; and
   a protection unit electrically connected to the drive device, and comprising a fifth switch having a first terminal electrically connected to the drive device, a second terminal for receiving an alarm signal and a third terminal electrically connected to the ground,
   wherein the third switch, the fourth switch, the first switch, the second switch and the coil form a bridge connection.

2. The fan system as claimed in claim 1, wherein the protection unit further comprises a fourth resistor electrically connected to the drive device and the first terminal of the fifth switch.

3. The fan system as claimed in claim 1, wherein the protection unit further comprises a fifth resistor electrically connected to the drive device and the second terminal of the fifth switch.

4. A fan system comprising:
   a first switch;
   a second switch;
   a coil;
   a drive device comprising a third switch and a fourth switch, and controlling the first, second, third, and fourth switches to turn on or off so that current flowing through the coil is varied;
   a soft-start unit electrically connected to the drive device; and
   a protection unit electrically connected to the drive device, and comprising a fifth switch having a first terminal electrically connected to the drive device, a second terminal for receiving an alarm signal and a third terminal electrically connected to the ground,
   wherein the third switch, the fourth switch, the first switch, the second switch and the coil form a bridge connection.

* * * * *